(12) United States Patent
MacMillan et al.

(10) Patent No.: US 8,648,125 B2
(45) Date of Patent: Feb. 11, 2014

(54) STABILIZATION OF SILSESQUIOXANE RESINS

(75) Inventors: Andrew MacMillan, Lombard, IL (US);
Eric Scott Moyer, Midland, MI (US);
Michael Robert Reiter, Midland, MI (US); Kasumi Takeuchi, Midland, MI (US); Sheng Wang, Midland, MI (US);
Craig Rollin Yeakle, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/513,588

(22) PCT Filed: Dec. 2, 2010

(86) PCT No.: PCT/US2010/058251
§ 371 (c)(1),
(2), (4) Date: Jun. 4, 2012

(87) PCT Pub. No.: WO2011/068766
PCT Pub. Date: Jun. 9, 2011

(65) Prior Publication Data
US 2012/0252920 A1    Oct. 4, 2012

Related U.S. Application Data

(60) Provisional application No. 61/266,572, filed on Dec. 4, 2009.

(51) Int. Cl.
*C09D 183/00* (2006.01)
*C09K 3/00* (2006.01)

(52) U.S. Cl.
USPC .................... 522/79; 252/183.12; 524/385

(58) Field of Classification Search
None
See application file for complete search history.

(56) References Cited

U.S. PATENT DOCUMENTS

| 3,782,940 | A | * | 1/1974 | Ohto et al. ............ 430/323 |
| 4,035,355 | A | * | 7/1977 | Baney et al. ........... 528/24 |
| 5,079,312 | A |   | 1/1992 | Isozaki et al. |
| 5,621,034 | A | * | 4/1997 | Mautner ............... 524/321 |
| 5,993,532 | A | * | 11/1999 | Broderick et al. ...... 106/287.12 |
| 6,020,410 | A | * | 2/2000 | Hacker et al. ......... 524/267 |
| 6,303,268 | B1 | * | 10/2001 | Namba et al. ......... 430/270.1 |
| 6,414,049 | B1 |   | 7/2002 | Alli et al. |
| 8,377,634 | B2 |   | 2/2013 | Albaugh et al. |

(Continued)

FOREIGN PATENT DOCUMENTS

| JP | 2006169391 |   | 6/2006 |
| JP | 2008248239 |   | 10/2008 |
| JP | 2008256966 |   | 10/2008 |
| JP | 2008256966 | A * | 10/2008 |

OTHER PUBLICATIONS

Machine-generated English language translation of JP-2008256966, 25 pages, translation generated May 2013.*

*Primary Examiner* — Robert S Loewe
(74) *Attorney, Agent, or Firm* — Dow Corning Corp.; Sharon K. Brady; Claude F. Purchase

(57) ABSTRACT

Disclosed is silsesquioxane resin composition that contains a free radical curable functional group that is stabilized with a hydrophilic inhibitor. The hydrophilic inhibitor that has the capability to scavenge free radicals such as ascorbic acid or salicylic acid is used to stabilize the resin. The resins are useful in semiconductor formation such as for anti-reflective coatings, hardmasks or photoresist layers.

4 Claims, 1 Drawing Sheet

Patterned photoresist

Antireflective coating

Hard mask

(56) References Cited

U.S. PATENT DOCUMENTS

| | | | |
|---|---|---|---|
| 2002/0032250 A1* | 3/2002 | Okazaki et al. | 522/83 |
| 2006/0111576 A1 | 5/2006 | Matsuzaki | |
| 2007/0212886 A1* | 9/2007 | Uh et al. | 438/706 |
| 2009/0165913 A1* | 7/2009 | Hergenrother et al. | 152/451 |
| 2009/0286188 A1* | 11/2009 | Hatakeyama et al. | 430/323 |
| 2009/0326255 A1* | 12/2009 | Hergenrother et al. | 556/425 |
| 2010/0080983 A1* | 4/2010 | Anderson | 428/334 |
| 2012/0077922 A1* | 3/2012 | Hergenrother et al. | 524/440 |

* cited by examiner

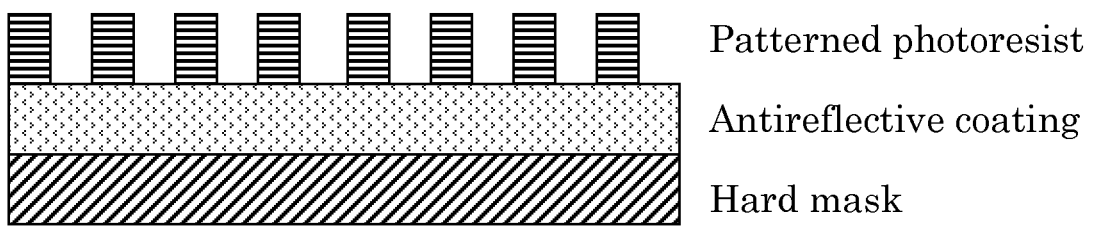

STABILIZATION OF SILSESQUIOXANE RESINS

CROSS-REFERENCE TO RELATED APPLICATIONS

This application is a U.S. national stage filing under 35 U.S.C. §371 of PCT Application No. PCT/US10/58251 filed on Dec. 2, 2010, currently pending, which claims the benefit of U.S. Provisional Patent Application No. 61/266,572 filed Dec. 4, 2009 under 35 U.S.C. §119 (e). PCT Application No. PCT/US10/58251, U.S. Provisional Patent Application No. 61/266,572 are hereby incorporated by reference.

BACKGROUND OF THE INVENTION

Silsesquioxane resins and other silicon based resins have found wide applications in electronic industry and other industries. To facilitate cure and to control the properties of the resins, the resins typically contain some silanol and/or thermal curable or UV curable functional groups, such as acrylate functional group, methacrylate functional group, epoxy functional group, among others. In the electronics industry, the end customers prefer keeping the resin at ambient temperature for transportation and storage for about three to six months. Unfortunately, because of their nature, these resins are typically not stable enough under ambient temperature, especially for resins with silanol and/or free radical curable functional groups. One way of stabilizing materials with these functional groups has been by adding an organic inhibitor, e.g. tert-butylated hydroxyl toluene (BHT). However, with silsesquioxane resins, this organic inhibitor does not always work, perhaps due to uneven distribution. Therefore, other inhibitors are desired.

BRIEF SUMMARY OF THE INVENTION

This invention relates to the stabilization of silsesquioxane resin that contains silanol and/or a free radical curable functional group. A hydrophilic inhibitor that has the capability of scavenging free radicals, such as ascorbic acid, salicylic acid or maleic anhydride is used to stabilize the resin.

DETAILED DESCRIPTION OF THE INVENTION

It has been found that hydrophilic materials, such as Vitamin C (L-ascorbic acid), D-ascorbic acid, salicylic acid, and maleic anhydride act as stabilizers when they are dissolved in the silsesquioxane resin solution. Without being bound by theory, these inhibitors are thought to be effective because they are relatively hydrophilic, and can form strong hydrogen bonding with the silanol groups and/or the free radical curable functional group to prevent further silanol condensation. Moreover, because it is hydrogen bonding with silanol groups and/or free radical curable functional group, it is conceivable that the inhibitor is readily available for scavenging any generated free radicals to prevent molecular weight growth.

This invention pertains to a stable silsesquioxane resin composition comprising (I) a silsesquioxane resin comprising:

(a) the unit $(RSiO_{(3-x)/2}(OR')_x)_m$
where R is a reactive organic group selected from groups containing acryloxy functionality such as methacryloxypropyl group, acryloxypropyl group, or styrenic functionality, R' is hydrogen atom or a hydrocarbon group having from 1 to 4 carbon atoms; and (b) optionally one or any combination of the following units $(R^1SiO_{(3-x)/2}(OR')_x)_n$ $(R^2SiO_{(3-x)/2}(OR')_x)_o$ $(Ph(CH_2)_sSiO_{(3-x)/2}(OR')_x)_p$ $(R^3R^4SiO)_q$ $(SiO_{(4-x)/2}(OR')_x)_r$ where $R^1$ is an aliphatic group, e.g. methyl, ethyl, vinyl, with 1-4 carbons; $R^2$ is a hydrophilic group; $R^3$ and $R^4$ are groups are independently selected from methyl or phenyl, R' is hydrogen atom or a hydrocarbon group having from 1 to 4 carbon atoms, Ph represents a phenyl group; s has a value of 0, 1, 2, 3, or 4; x has a value of 0, 1 or 2; and in the resin m has a value of 0.025 to 1; n has a value of 0 to 0.95; o has a value of 0.0 to 0.20; p has a value of 0.0 to 0.75; q has a value of 0 to 0.75; and m+n+o+p+q+r=1 and (II) a hydrophilic inhibitor comprising strong hydrogen bonding groups such as a hydroxyl group or a carboxylic group and (III) polar organic solvent, such as 4-methyl-2-pentanol or 1-pentanol, propylene glycol methyl ether acetate (PGMEA); (IV) optionally a thermal free radical initiator, or a photo free radical initiator.

Preparation of a Silsesquioxane Resin.

An exemplary silsesquioxane resin contains 6 to 60 mole % of units containing —OR' groups, depending upon the synthesis route and starting materials. If the total amount of units in the silsesquioxane resin containing —OR' groups exceed 70 mole %, then gellation and instability of the resin may occur. The silsesquioxane resin has a weight average molecular weight (Mw) in the range of 500 to 200,000, alternatively in the range of 500 to 100,000, alternatively in the range of 700 to 30,0000 as determined by gel permeation chromatography employing RI detection and polystyrene standards.

Typically the silsesquioxane resin of the present invention is produced by the hydrolysis and condensation of the appropriate silanes. By this method it is possible that residual —OH and/or —OR' will remain in the silsesquioxane resin as a result of incomplete hydrolysis or condensation.

The silsesquioxane resin is typically produced in the presence of a solvent. Any suitable organic or silicone solvent that does not contain a functional group other than alcohol which may participate in the hydrolysis and/or condensation reaction may be used in producing the silsesquioxane resin. The solvent is generally used in an amount of 40 to 98 weight percent based on the total weight of solvent and silane reactants, alternatively 70 to 90 weight percent. The reaction may be carried out as a dual phase or single-phase system.

Useful organic solvents may be exemplified by, but not limited to, saturated aliphatics such as n-pentane, hexane, n-heptane, and isooctane; cycloaliphatics such as cyclopentane and cyclohexane; aromatics such as benzene, toluene, xylene, mesitylene; ethers such as tetrahydrofuran, dioxane, ethylene glycol diethyl ether, ethylene glycol dimethyl ether; ketones such as methylisobutyl ketone (MIBK) and cyclohexanone; halogen substituted alkanes such as trichloroethane; halogenated aromatics such as bromobenzene and chlorobenzene; esters such as propylene glycol monomethyl ether acetate (PGMEA), isobutyl isobutyrate and propyl propionate; alcohols such as methanol, ethanol, and isopropanol. Useful silicone solvents may be exemplified by, but not limited to cyclic siloxanes such as octamethylcyclotetrasiloxane, and decamethylcyclopentasiloxane. A single solvent may be used or a mixture of solvents may be used.

The reaction to produce the silsesquioxane resin can be carried out at any temperature so long as it does not cause significant gellation or cause curing of the silsesquioxane resin. Typically the reaction is carried out at a temperature in the range of 5° C. to 150° C., with 15° C. to 110° C. suggested.

The time to form the silsesquioxane resin is dependent upon a number of factors such as the temperature, the type and amount of silane reactants, and the amount of catalyst. Typically the reaction time is from several minutes to several hours. One skilled in the art will be able to readily determine the time necessary to complete the reaction. Acid catalysts that may be used to facilitate the reaction include, but are not limited to, nitric acid, sulfuric acid, sulfonic acid, hydrochloric acid, acetic acid, and others. Base catalysts that may be used to facilitate the reaction include, but are not limited to, sodium hydroxide, potassium hydroxide, cesium hydroxide, tetramethylammonium hydroxide, tetrabutylammonium hydroxide, triethylamine, among others.

Following completion of the reaction the catalyst may be optionally removed. Methods for removing the catalyst are well known in the art and would include neutralization, stripping or water washing or combinations thereof. Large amounts of catalyst may negatively impact the shelf life of the silicone resin especially when in solution thus its removal is suggested.

In the process for making the silsesquioxane resin, after the reaction is complete, volatiles may be removed from the silsesquioxane resin solution under reduced pressure. Such volatiles include alcohol by-products, excess water, catalyst, hydrochloric acid (chlorosilane routes) and solvents. Methods for removing volatiles are known in the art and include, for example, distillation.

A Stabilized Resin Composition

Compositions useful for various applications, but in particular a coating composition, comprises the silsesquioxane resin prepared as described above. Following the reaction to produce the silsesquioxane resin, a number of optional steps may be carried out to obtain the silsesquioxane resin in the desired form or desired concentration. For example, the silsesquioxane resin may be concentrated by removing the solvent. The method of solvent removal is not critical and numerous methods are well known in the art (e.g. distillation under heat and/or vacuum). Once the concentration of the silsesquioxane resin reaches to a certain concentration, the resin can be diluted with the same or another solvent for a particular use. Alternatively, if a different solvent, other than the solvent used in the reaction, is desired for the final product, a solvent exchange may be done by adding a secondary solvent and removing the first solvent through distillation, for example. Additionally, the resin concentration in solvent can be adjusted by removing some of the solvent or adding additional amounts of solvent.

The composition typically contains a solvent. Useful solvents include, but are not limited to, 1-methoxy-2-propanol, 4-methyl-2-pentanol, 1-pentanol, propylene glycol monomethyl ethyl acetate, γ-butyrolactone, and cyclohexanone, among others. In one embodiment, a coating composition comprises from 10% to 99.9 wt % solvent based on the total weight of the coating composition. In a particular embodiment, the solvent amount is 80 to 98 wt %.

The coating composition further comprises a stabilizer in an amount of up to 50,000 ppm, alternatively 10 to 10,000 ppm, alternatively, 100 to 500 ppm, based on the total weight of the coating composition. A stabilizer is a compound which is capable of scavenging a free radical during the storage of the coating composition. Stabilizers include but are not limit to Vitamin C (L-ascorbic acid), D-ascorbic acid, salicylic acid, and maleic anhydride.

The coating composition optionally comprises an activator, depending upon the cure temperature and the required crosslink density. In the case wherein the silsesquioxane resin comprises acrylate or methacrylate functional or styrenic groups, the activator is selected from a free radical thermal initiator or a photo radical initiator.

A free radical thermal initiator is a compound which is capable of generating a free radical when heated during baking step. Suitable free radical thermal initiators include, but not limited to, benzoyl peroxide, dicumyl peroxide, azobisisobutyronitrile (AIBN), among others. The thermal initiator added to the solution can be a single initiator or two or more of the mixture of the thermal initiators.

A free radical photo initiator is a compound which is capable of generating a free radical when exposed to UV during the bake step. Suitable photo initiators include, but not limited to 2,4,6-trimethylbenzoyldiphenyl phosphine oxide, di-(2,4,6-trimethylbenoylphenyl phosphine oxide, benzoin derivatives, methylolbenzoin derivative, 4-benzyl-1,3-dioxolane derivatives, benzilketals, 1-hydroxycyclohexy phenylketone, 2-methyl-1-[4-(methylthio)phenyl]-2-morpholino-propan-2-one, 2-benzyl-2-dimethylamino-1-(4-morpholinophenyl)-butan-1-one, α,α-dialkoxyacetophenones, phenylglyoxylates.

Typically the activator is present in the coating composition in an amount of up to 20,000 ppm, alternatively 10 to 10,000 ppm, based on the total weight of the coating composition.

The coating composition of the present invention containing a stabilizer may be used in a manner identical to those previously available compositions that do not include a stabilizer. In use, the coating composition is applied on a substrate having a pattern thereon. A non-limiting example of the substrate is a semiconductor device, such as silicon-based devices and gallium arsenide-based devices intended for use in the manufacture of a semiconductor component. Typically, the device comprises at least one semiconductive layer and a plurality of other layers comprising various conductive, semiconductive, or insulating materials.

The pattern on the semiconductor device is typically a photoresist layer that has been applied and patterned. Typically the patterned photoresist is formed over an antireflective coating which is formed over a hardmask as seen in FIG. 1. Methods for applying the photoresist, antireflective coating and hardmask layers are known in the art. Methods for producing a pattern in the photoresist layer are also known in the art.

Specific methods for application of the coating composition to the substrate include, but are not limited to, spin-coating, dip-coating, spay-coating, flow-coating, screen-printing and others. The typical method for application is spin coating. Typically, coating involves spinning the electronic device, at 1,000 to 2,000 RPM, and adding the coating composition to the surface of the spinning electronic device.

Once the coating composition has been applied, any solvent is removed and the coating composition exposed to a curing mechanism to activate the activator in the reverse patterning coating layer and cause the coating composition to cure. Depending on the functional group on the silsesquioxane resin and the activator in the composition, the curing mechanism may be thermal or by radiation.

To thermally cure the coating composition, the coated substrate is heated to a sufficient temperature for a sufficient duration to lead to curing. Curing may take place by heating the coated electronic device at 80° C. to 450° C. for 0.1 to 60 minutes, alternatively 150° C. to 275° C. for of 0.5 to 5 minutes, alternatively 200° C. to 250° C. for 0.5 to 2 minutes, or at any temperature suitable for the substrate and the coating composition, selected from between 80 to 450° C. for a time period selected from between 0.1 to 60 minutes, wherein the higher the temperature, the shorter the cure time. Any method of heating may be used during the curing step. For example, the coated electronic device may be placed in a quartz tube furnace, convection oven or allowed to stand on hot plates.

Radiation curing occurs when the coating composition is exposed to a radiation source such as UV, X-ray, e-beam, EUV, or the like. Typically ultraviolet radiation having a wavelength of 193 nm to 365 nm is used, alternatively ultraviolet radiation having a wavelength of 246 nm or 365 nm is used. Suitable radiation sources include mercury, mercury/xenon, and xenon lamps. At longer wavelength radiation is used, e.g., 365 nm, it is suggested to add a sensitizer to the coating composition to enhance absorption of the radiation. Full exposure of the coating composition is typically achieved with less than 100 mJ/cm$^2$ of radiation, alternatively with less than 50 mJ/cm$^2$ of radiation.

EXAMPLES

The following examples are included to demonstrate embodiments of the invention. It should be appreciated by those of skill in the art that the techniques disclosed in the examples which follow represent techniques discovered by the inventor to function well in the practice of the invention. However, those skilled in the art should, in light of the present disclosure, appreciate that many changes can be made in the specific embodiments which are disclosed and still obtain a like or similar result without departing from the spirit and scope of the invention. All percentages are in wt. %.

Example 1

Preparation of a Silsesquioxane Composition Having the Unit Formula $T^{Me}_{0.80}T^{R1}_{0.20}$, R1=— CH$_2$CH$_2$CH$_2$O—CO—C(CH$_3$)=CH$_2$ In the above unit formula, $T^R$ is a "T unit" having the general structure RSiO$_{3/2}$, and Me is methyl. Therefore $T^{Me}$ is CH$_3$—SiO$_{3/2}$. R1 is indicated above.

150 g of toluene, 109.0 g of methyltrimethoxysilane (0.80 mol), 49.6 g of (3-methacryloxy)propyltrimethoxysilane (0.20 mol), 294 g of methanol, 71 g of water, 0.345 g 10% tetramethylammonium hydroxide solution in methanol. 5 pellets of 2,6-bis(1,1-dimethylethyl)-4-methylphenol (BHT) was added to the mixture. The mixture was stirred for 2 hours at room temperature and then refluxed for 2 hours. Then, 3 g of 0.1 N nitric acid was combined in a flask and the mixture was stirred for 5 min. After about 350 g of solvent was removed from the Dean-Stark, the temperature was raised to 72° C. Subsequently, 150 g of toluene was added to the reactor and the temperature was raised to 86° C. by continuously removing the solvent from the Dean-Stark trap. Once the temperature reached to 86° C., the reaction was stopped. The clear solution was transferred to another flask and the solvent was removed on a rotary evaporator at 40° C. The colorless viscous liquid was diluted with 4-methyl-2-pentanol to 10 wt %. The residual toluene was continuously removed on the rotary evaporator at 40° C. until the solution was concentrated to about 30 wt %. The solution was again diluted to 10 wt % with 4-methyl-2-pentanol.

Example 2

Preparation of a Silsesquioxane Composition Having the Unit Formula $T^{Me}_{0.60}T^{R1}_{0.20}Q_{0.20}$, R1=— CH$_2$CH$_2$CH$_2$O—CO—C(CH$_3$)=CH$_2$ Q is a "Q unit" having the general structure SiO$_{4/2}$.

270 g of toluene, 61.3 g of methyltrimethoxysilane, 37.25 g of (3-methacryloxy)propyltrimethoxysilane, 31.25 g of tetraethylorthosilicate (TEOS), 362 g of methanol, 54 g of water, 0.345 g 10% tetramethylammonium hydroxide solution in methanol. The mixture was stirred for 2 hours at room temperature and then 5 pellets of 2,6-bis(1,1-dimethylethyl)-4-methylphenol (BHT) was added to the mixture then refluxed for 3 hours and. 10 g of acetic acid was added to the mixture and the mixture was stirred for 5 min. After about 350 g of solvent was removed from the Dean-Stark, the temperature was raised to 72° C. Subsequently, 150 g of toluene was added to the reactor and the temperature was raised to 86° C. by continuously removing the solvent from the Dean-Stark trap. Once the temperature reached to 86° C., the reaction was stopped. The clear solution was transferred to another flask and the solvent was removed on a rotary evaporator at 40° C. The colorless viscous liquid was diluted with 4-methyl-2-pentanol to 10 wt %. The residual toluene was continuously removed on the rotary evaporator at 40° C. until the solution was concentrated to about 30 wt %. The solution was again diluted to 10 wt % with 4-methyl-2-pentanol.

Example 3

Effect of Ascorbic Acid on the Stability of the Silsesquioxane Resin Solution in Example I Six 250 mL HDPE bottles were obtained. To each of the plastic bottles was added 200 g of the silsesquioxane solutions made in Example I. Then, 0.010 g, 0.020 g, 0.050 g, 0.100 g of ascorbic acid was added to four of the solutions, respectively. As a control, one of the solutions was left blank. For comparison, to the remaining solution was added 0.100 g of tert-butylated hydroxyl toluene. The solution were shaken and kept for 48 hours prior to filtration. Subsequently, the molecular weights of the filtered solutions were measured by gel permeation chromatography (GPC). The stability of the resin solution was monitored by molecular weight measurements. The solutions were kept in an air ventilated oven at 35° C. and some samples were pulled out at approximately 1 week, 2 weeks, and 4 weeks for GPC analyses in order to monitor the molecular weight.

TABLE 1

Effect of Ascorbic Acid on the Storage Stability of the Silsesquioxane Resin Solution in Example I at 35° C.

| | 0 day | | | 7 days | | | 14 days | | | 32 days | | |
|---|---|---|---|---|---|---|---|---|---|---|---|---|
| Sample | Mn | Mw | Mw/Mn | Mn | Mw | Mw/Mn | Mn | Mw | Mw/Mn | Mn | Mw | Mw/Mn |
| Example I | 3680 | 17900 | 4.86 | 3740 | 19700 | 5.27 | 3970 | 22800 | 5.69 | 4120 | 26600 | 6.46 |
| Ex. I + 50 ppm Ascorbic Acid | 3660 | 18100 | 4.94 | 3630 | 18200 | 5.00 | 3740 | 19000 | 5.09 | 3780 | 20000 | 5.29 |
| Ex. I + 100 ppm Ascorbic Acid | 3780 | 19700 | 5.21 | 3750 | 19900 | 5.32 | 3830 | 20100 | 5.23 | 3700 | 19700 | 5.32 |
| Ex. I + 250 ppm Ascorbic Acid | 3780 | 19700 | 5.21 | 3730 | 19800 | 5.31 | 3770 | 19800 | 5.23 | 3710 | 19700 | 5.31 |
| Ex. I + 500 ppm v Ascorbic Acid | 3760 | 19700 | 5.24 | 3730 | 19800 | 5.31 | 3770 | 19800 | 5.23 | 3710 | 19700 | 5.31 |
| Comp. Ex. I Ex. I + 500 ppm BHT | 3450 | 15300 | 4.43 | 3530 | 17300 | 4.89 | 3690 | 19100 | 5.17 | 3930 | 23300 | 5.94 |

Example 4

Effect of Salicylic Acid on the Stability of the Silsesquioxane Resin Solution in Example I Five 250 mL HDPE bottles were obtained. To each of the plastic bottles was added 200 g of the silsesquioxane solutions made in example I. Then, 0.020 g, 0.050 g, 0.100 g of ascorbic acid was added to five of the solutions, respectively. As a control, one of the solutions was left blank. The solutions were shaken and kept for 48 hours prior to filtration. Subsequently, the molecular weights of the filtered solutions were measured by gel permeation chromatography (GPC). The stability of the resin solution was monitored by molecular weight measurements. Then, the remaining solutions were kept in an air ventilated oven at 35° C. and some samples were pulled out at approximately 1 week, 2 weeks, and 4 weeks for GPC analyses in order to monitor the molecular weight.

TABLE 2

Effect of Salicylic Acid on the Stability of the Silsesquioxane Resin Solution in Example I at 35° C.

| | 0 day | | | 7 days | | | 15 days | | | 30 days | | |
|---|---|---|---|---|---|---|---|---|---|---|---|---|
| Sample | Mn | Mw | Mw/Mn | Mn | Mw | Mw/Mn | Mn | Mw | Mw/Mn | Mn | Mw | Mw/Mn |
| Example I | 3750 | 19800 | 5.28 | 3900 | 22100 | 5.68 | 4010 | 24200 | 6.03 | 4070 | 26800 | 6.58 |
| Ex. I + 100 ppm Salicylic Acid | 4000 | 23100 | 5.78 | 4000 | 23100 | 5.78 | 3960 | 23000 | 5.80 | 3920 | 22900 | 5.84 |
| Ex. I + 250 ppm Salicylic Acid | 4040 | 23200 | 5.76 | 4020 | 23000 | 5.73 | 4000 | 23300 | 5.83 | 3920 | 23200 | 5.91 |
| Ex. I + 500 ppm Salicylic Acid | 3980 | 23000 | 5.78 | 3960 | 23100 | 5.83 | 3970 | 22900 | 5.77 | 3950 | 23100 | 5.86 |

Example 5

Effect of Various Inhibitors on the Stability of the Silsesquioxane Resin Solution of Example I Five 250 mL HDPE bottles were obtained. To each of the plastic bottles was added 200 g of the silsesquioxane solutions made in example I. Then, 0.100 g of BHT, L-ascorbic acid, salicylic acid, and maleic anhydride were added to five of the solutions, respectively. As a control, one of the solutions was left blank. The solutions were shaken and kept for 48 hours prior to filtration. Subsequently, the molecular weights of the filtered solutions were measured by gel permeation chromatography (GPC). The stability of the resin solution was monitored by molecular weight measurements. Then, the remaining solutions were kept in an air ventilated oven at 35° C. and some samples were pulled out at approximately 1 week, 2 weeks, and 4 weeks for GPC analyses in order to monitor the molecular weight.

TABLE 3

Effect of Salicylic Acid on the Stability of the Silsesquioxane Resin Solution of Example I at 35° C.

| Sample | 0 day | | | 7 days | | | 14 days | | | 30 days | | |
|---|---|---|---|---|---|---|---|---|---|---|---|---|
| | Mn | Mw | Mw/Mn | Mn | Mw | Mw/Mn | Mn | Mw | Mw/Mn | Mn | Mw | Mw/Mn |
| Example I | 3820 | 23200 | 6.08 | 4030 | 26900 | 6.68 | 4140 | 29200 | 7.06 | 4160 | 29700 | 7.14 |
| Ex. I + 500 ppm L-Ascorbic Acid | 3780 | 23000 | 6.09 | 3960 | 26000 | 6.56 | 3960 | 26400 | 6.66 | 4010 | 26400 | 6.60 |
| Ex. I + 500 ppm Salicylic Acid | 4040 | 28800 | 7.13 | 4080 | 29000 | 7.11 | 4080 | 29000 | 7.11 | 4080 | 28900 | 7.07 |
| Ex. I + 500 ppm Maleic Anhydride | 4010 | 28700 | 7.14 | 4100 | 29000 | 7.09 | 4070 | 28700 | 7.07 | 4090 | 28800 | 7.03 |

Example 6

Effect of Various Inhibitors on the Silsesquioxane Resin Solution Stability of Example II Five 250 mL HDPE bottles were obtained. To each of the plastic bottles was added 200 g of the silsesquioxane solutions made in example I. Then, 0.100 g of BHT, L-ascorbic acid, salicylic acid, and maleic anhydride were added to five of the solutions, respectively. As a control, one of the solutions was left blank. The solutions were shaken and kept for 48 hours prior to filtration. Subsequently, the molecular weights of the filtered solutions were measured by gel permeation chromatography (GPC). The stability of the resin solution was monitored by molecular weight measurements. Then, the remaining solutions were kept in an air ventilated oven at 35° C. and some samples were pulled out at approximately 1 week and 2 weeks for GPC analyses in order to monitor the molecular weight.

TABLE 4

Effect of Salicylic Acid on the Stability of the Silsesquioxane Resin Solution of Example II at 35° C.

| Sample | 0 day | | | 7 days | | | 14 days | | |
|---|---|---|---|---|---|---|---|---|---|
| | Mn | Mw | Mw/Mn | Mn | Mw | Mw/Mn | Mn | Mw | Mw/Mn |
| Example II | 2120 | 5560 | 2.62 | 2310 | 6380 | 2.77 | 2330 | 6650 | 2.85 |
| Ex. II + 500 ppm BHT | 2120 | 5550 | 2.62 | 2250 | 6180 | 2.75 | 2310 | 6630 | 2.87 |
| Ex. II + 500 ppm L-Ascorbic Acid | 2130 | 5500 | 2.59 | 2050 | 5540 | 2.70 | 2040 | 5530 | 2.71 |
| Ex. II + 500 ppm Salicylic Acid | 2000 | 5360 | 2.68 | 1930 | 5440 | 2.81 | 1850 | 5370 | 2.91 |
| Ex. II + 500 ppm Maleic Anhydride | 2310 | 5550 | 2.40 | 2500 | 5820 | 2.33 | 2500 | 5730 | 2.29 |

The invention claimed is:

1. A stable silsesquioxane resin composition comprising
(I) a silsesquioxane resin comprising:
   (a) the unit $(RSiO_{(3-x)/2}(OR')_x)_m$
      where R is a reactive organic group selected from groups containing acryloxy functionality such as methacryloxypropyl group, acryloxypropyl group, or styrenic functionality, R' is hydrogen atom or a hydrocarbon group having from 1 to 4 carbon atoms; and
   (b) optionally one or any combination of the following units $(R^1SiO_{(3-x)/2}(OR')_x)_n$ $(R^1SiO_{(3-x)/2}(OR')_x)_o$ $(Ph(CH_2)_sSiO_{(3-x)/2}(OR')_x)_p$ $(R^3R^4SiO)_q$ $(SiO_{(4-x)/2}(OR')_x)_r$ where $R^1$ is an aliphatic group, e.g. methyl, ethyl, vinyl, with 1-4 carbons; $R^2$ is a hydrophilic group; $R^3$ and $R^4$ are groups are independently selected from methyl or phenyl, R' is hydrogen atom or a hydrocarbon group having from 1 to 4 carbon atoms, Ph represents a phenyl group; s has a value of 0, 1, 2, 3, or 4; x has a value of 0, 1 or 2; and in the resin m has a value of 0.025 to 1; n has a value of 0 to 0.95; o has a value of 0.0 to 0.20; p has a value of 0.0 to 0.75; q has a value of 0 to 0.75; and m+n+o+p+q+r=1 and (II) a hydrophilic inhibitor comprising strong hydrogen bonding groups, wherein the hydrophilic inhibitor is selected from L-ascorbic acid, D-ascorbic acid, maleic anhydride and salicylic acid (III) polar organic solvent, and (IV) optionally a thermal free radical initiator or a photo free radical initiator.

2. The silsesquioxane resin composition according to claim 1, wherein the hydrophilic inhibitor is selected from maleic anhydride and salicylic acid.

3. The silsesquioxane resin composition according to claim 1, wherein the polar organic solvent is selected from 4-methyl-2-pentanol, 1-pentanol, and propylene glycol methyl ether acetate (PGMEA).

4. The silsesquioxane resin composition according to claim 1 comprising a thermal free radical initiator or a photo free radical initiator.

* * * * *